United States Patent [19]
Shimizu

[11] Patent Number: 5,441,349
[45] Date of Patent: Aug. 15, 1995

[54] SLIDE BEARING

[76] Inventor: Rikuro Shimizu, 29-4, Nanzenjikitanobo-cho, Sakyo-ku, Kyoto, Japan

[21] Appl. No.: 295,436

[22] Filed: Aug. 25, 1994

[30] Foreign Application Priority Data

Oct. 19, 1993 [JP] Japan .................. 5-286131
Apr. 29, 1994 [JP] Japan .................. 6-113608

[51] Int. Cl.⁶ .................. F16C 33/02; F16C 33/10
[52] U.S. Cl. .................. 384/276; 384/282; 384/286
[58] Field of Search .................. 384/276, 282–285, 384/286, 291, 293, 302

[56] References Cited

U.S. PATENT DOCUMENTS

| | | | |
|---|---|---|---|
| 378,978 | 3/1888 | Ryan | 384/282 |
| 3,256,049 | 6/1966 | Josephson et al. | 384/286 X |
| 4,758,202 | 7/1988 | Maciag et al. | 384/276 |
| 4,910,788 | 3/1990 | Shimizu | 384/192 |

Primary Examiner—Thomas R. Hannon
Attorney, Agent, or Firm—Armstrong, Westerman, Hattori, McLeland & Naughton

[57] ABSTRACT

A slide bearing comprising: an outer cylinder in which two ends of a cylindrical section made of thin metal plate are respectively provided with a flange and an annular side wall section formed by bending inwardly and perpendicularly; and either a plurality of plate-like bearing elements or a single bearing element both provided with an opening having convexes and concaves in the center so that a shaft to be supported may be supported by the convexes in a state of face contact; the concaves of the bearing elements being filled with a lubricant.

16 Claims, 14 Drawing Sheets

SLIDE BEARING

BACKGROUND OF THE INVENTION

The present invention relates to improvements of slide bearing and, more particularly, to a slide bearing adapted to light load which is capable of reducing a resistance during sliding operation, easy to be machined, economical in production cost, possible to be formed into the same size as roller bearing of small diameter, and interchangeable with roller bearing.

Hitherto, rolling bearings have been employed as bearing of small diameter such as the one for small size motor or micro-motor. Cost of the rolling bearings is, however, rather high and, therefore, use of slide bearing composed of bearing alloy having interchange-ability with rolling bearing has been recently proposed as substitute. For example, the U.S. Pat. No. 4,910,788 issued to the inventor of the present invention has already disclosed a slide bearing unit in this sense.

However, a problem exists in that the mentioned known slide bearing of small diameter has a relatively large frictional surface, thereby unavoidably producing a high resistance, eventually resulting in heavy sliding.

SUMMARY OF THE INVENTION

The present invention was made to solve the above-discussed problem and has an object of providing an improved slide bearing which is capable of reducing the resistance during sliding operation, possible to be formed into the same size as rolling bearing of small diameter, and interchageable with rolling bearing.

In order to accomplish the foregoing object, the slide bearing in accordance with the present invention has following aspects A to P:

A. A slide bearing comprising:

an outer cylinder in which; a flange is formed on one end of a cylindrical section made of thin metal plate by bending it inwardly and perpendicularly; an annular slide wall section is formed on the other end of the cylindrical section by bending it inwardly and perpendicularly; and a plurality of bearing elements (later-described) are superimposed one another in internal part of the outer cylinder;

said plurality of bearing elements being disk-shaped so as to be disposed in said outer cylinder; and in the center of which an opening having a plurality of concaves and convexes are formed; said convexes protruding inwardly being capable of supporting an object to be supported in face contact with outer periphery of shaft of the object to be supported; and a lubricant being received in said concaves;

and a disk-shaped bearing element holder which is disposed inside said flange of the outer cylinder so that said bearing elements superimposed inside the outer cylinder may be pressed and secured to said side wall section; and in the center of said bearing element holder, an opening is provided so that the shaft of said object to be supported may be inserted therethrough.

B. A slide bearing as set forth in the above paragraph A, in which top end of said convexes is formed so that a wedge-like angle may be produced between a circumferential tangential line of said shaft and that of the convexes at a contact point between said convexes formed on the opening of the bearing elements and said shaft of the object to be supported.

C. A slide bearing as set forth in the above paragraph B, in which said wedge-like angle is produced by rounding two sides of the top end of said convexes formed on the opening of said bearing elements, and said concaves of the opening are formed so that inner part thereof is wider than entrance part.

D. A slide bearing as set forth in the above paragraph A, in which said convexes formed on the opening of bearing elements has a circumferential width of about 0.2 to 0.5 mm at the contact part between said shaft of the object to be supported and said convexes; and a very small step is formed on circumferential side of said contact part so as to produce a gap of 0.05 to 0.2 mm between peripheral surface of the shaft and the convexes, and two sides of the top end of each convex are rounded, whereby a substantially wedge-like angle is produced between said peripheral surface of the shaft and each convex.

E. A slide bearing as set forth in any of the above paragraphs A to D, in which periphery of said opening of the side wall section formed on one end of the outer cylinder is inclined inwardly so that corner on the peripheral edge of the opening may be slightly protruded inwardly.

F. A slide bearing as set forth in any of the above paragraphs A to E, in which a disk-like convex is formed in said bearing element holder coaxially with an external diameter of the bearing element holder on the opposite side of a contact side in contact with said bearing element, said disk-like convex being either of the same size as an internal diameter of the opening of the flange of the outer cylinder or a little smaller than said internal diameter; and periphery of said opening formed in the center is inclined to the opposite direction of said protruding disk-like convex so that corner of peripheral edge of the opening may protrude a little toward the opposite direction of the protruding disk-like convex.

G. A slide bearing as set forth in any of the above paragrahs A to F, in which said bearing elements are formed by punching; in said opening, at least either one side or two sides of said corner of the peripheral edge on the top of the convexes formed on the opening is chamfered or rounded so as to form gaps for holding a lubricant between said peripheral edges on the opening of each bearing elements superimposed one another.

H. A slide bearing as set forth in any of the above paragraphs A to G, in which said outer cylinder and said bearing element holder are composed of one material selected from among steel plate, phosphor bronze plate, and other various kinds of metal plate; and said plurality of bearing elements are composed of one material or two or more materials selected from among steel plate, stainless steel plate, brass plate, other various kinds of metal plate and plastics.

I. A slide bearing as set forth in any of the above paragraphs A to H, in which a single bearing element having an opening of the same sectional shape as said plurality of bearing elements and of a required thickness is disposed, instead of said plurality of disk-shaped bearing elements disposed in said outer cylinder.

J. A slide bearing as set forth in the above paragraph I, in which said single bearing element is composed of only one material selected from among brass, phosphor bronze, sintered bearing alloy, and other various kinds of bearing material, and in which said concaves of the opening may be either filled or not filled with a lubricant when said single bearing element is composed of a sintered bearing alloy.

K. A slide bearing as set forth in any of the above paragraphs A to J, in which said side wall section of the outer cylinder is provided with an annular recessing section, and said bearing element holder is provided with an annular recessing section recessed from side face of the slide bearing on internal diameter side of said flange of the outer cylinder.

L. A slide bearing as set forth in any of the above paragraphs A to K, in which said bearing elements are provided with a plurality of bent edge sections formed by bending edges thereof at a bending angle 15° to 40°.

M. A slide bearing as set forth in any of the above paragraph L, in which three or more said bent edges are formed by bending from the outer periphery of the bearing elements toward one side of the bearing elements at a position 0.3 to 1.5 mm in radial direction.

N. A slide bearing as set forth in any of the above paragraphs A to M, in which an outer cylinder having a bulged cylindrical section of which outside is formed into a convex spherical surface, instead of said outer cylinder having said straight cylindrical section.

O. A slide bearing as set forth in the above paragraph N, in which curvature of said convex spherical surface of the outer cylinder is established so that a distance between a virtual cylindrical surface and said convex spherical surface is designed to be 0.1 to 0.4 mm in radial direction at a center position of width of the outer cylinder, said virtual cylindrical surface being formed by a cylindrical surface of which combined imaginarily drawing two crossover circle lines between two virtual planes tangential to two sides of the slide bearing and a virtual concave spherical surface in face contact with said convex spherical surface.

P. A slide bearing as set forth in any of the above paragraphs A to 0, in which said bearing element holder is omitted, whereby said bearing elements are directly pressed and secured to inside of said flange.

BRIEF DESCRIPTION OF THE DRAWINGS

In the drawings forming a part of the present invention, and in which like reference numerals are designated to like parts throughout the same.

DESCRIPTION OF THE PREFERRED EMBODIMENT

Referring now to the accompanying drawings, several embodiments of the present invention are described in detail hereinafter.

Figure 1A:
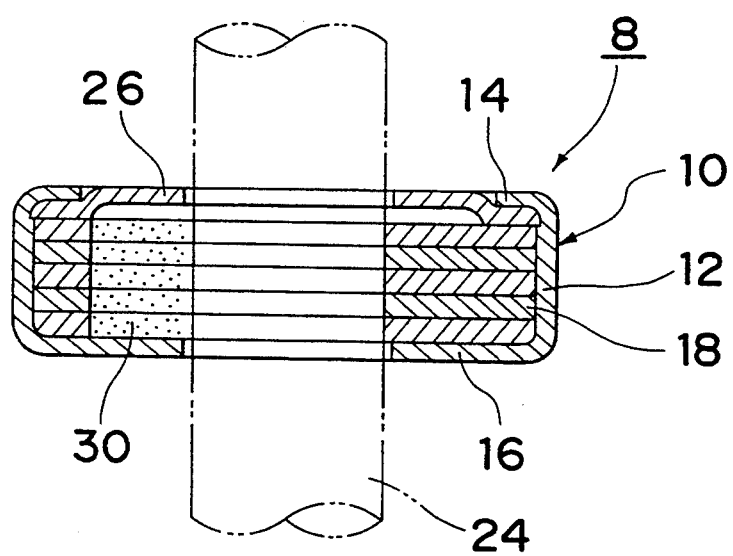
FIG. 1(A) and FIG. 1(B) are respectively a sectional view and a plan view illustrating an example of the invention.
Figure 1B:
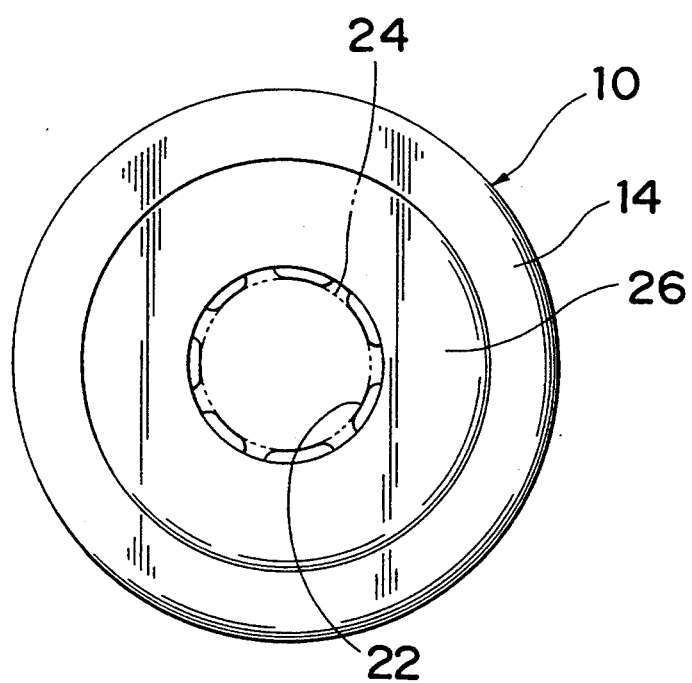

The slide bearing 8 as an example enlargedly illustrated in FIG. 1(A) and FIG. 1(B) is of small type having the same size as rolling bearing of small diameter. Referring to FIG. 1(A) and FIG. 1(B), reference numeral 10 denotes the outer cylinder, and one end of the cylindrical section 12 made of thin steel plate is formed into a flange 14 by bending it inwardly, while the other end is formed into the side wall section 16 by bending it inwardly and perpendicularly, and later-described bearing elements 18 are disposed inside.

The bearing elements 18 are made by press working of a stainless steel. As illustrated in FIG. 2(A) to FIG. 2(D), each bearing element 18 has a required thickness and formed into a disk-shaped member in the center of which the opening 20 having a plurality of concaves and convexes (each seven in this example) is provided. The bearing elements 18 can be fitted inside the outer cylinder 10, and each concave of the opening 20 is formed such that inner (deep) part may be wider than entrance part, while each convex 22 of the opening being in face contact with the outer periphery of a shaft 24 to be supported so as to support it. As illustrated in FIG. 2(D), top end of each convex is rounded so as to produce a wedge-like angles θ1, θ2 between the tangential line of the shaft 24 and the convexes 22 at their contact point. In this example, θ1 is equal to θ2. Further, as illustrated in FIG. 2(C), each corner in face contact with the shaft 24 at the top end of the convexes is rounded just a little slightly on one side of the bearing elements 18.

As illustrated in FIG. 1, a plurality of bearing elements 18 (five in this example) of above construction are fitted inside the outer cylinder 10 in such a manner as to be stacked or superimposed, and concave spaces on the opening 20 of the bearing elements 18 are filled or impregnated with a grease 30 serving as a lubricant. Further, the bearing elements 18 are disposed so as to be pressed by the flange 14 through the bearing element holder 26 made of thin steel plate. It is also satisfiable that either every other concaves or some selected concaves are filled with the grease 30, instead of filling every concave with the grease 30. The remaining empty concaves not filled with the grease perform a function such that, if the grease 30 leaks out of some concaves, the leaked grease may be received by the other empty concaves resulting in prevention of the grease from further leaking out of the bearing. It is also preferable that every concave is not always fully filled with the grease but partially filled therewith, although such partial filling may be a little troublesome.

Figure 3A:
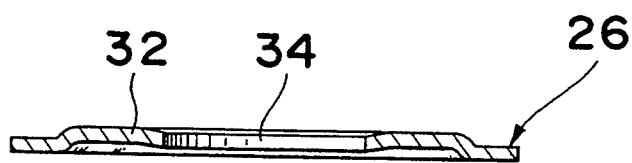
FIG. 3(A) and FIG. 3(B) are respectively a sectional view and a partially enlarged sectional view of another component employed in the same example.
Figure 3B:
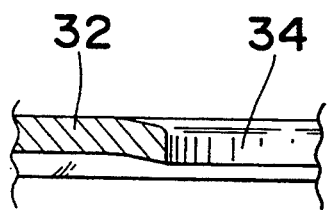

As illustrated in FIG. 3(A), the bearing element holder 26 is an annular plate member of which extermal diameter is sized so as to fit inside the outer cylinder 10. On one side of the bearing element holder 26, i.e., on the opposite side of a side contacting the bearing elements 18, a disk-like convex 32 of which diameter is smaller than internal diameter of the opening of the flange 14 is formed coaxially with external diameter, and in the center thereof, an opening 34 of which diameter is a little larger than that of said shaft 24 is provided. As illustrated in FIG. 3(B), periphery of the opening 34 is inclined to the opposite direction of the protruding direction of the disk-like convex 32 so that corner of the peripheral edge of the opening 32 may raised or protruded a little. In addition, protrusion level from outside of the disk-like convex 32 is decided so as not to get out from the outside of the flange 14 when it is mounted. For manufacturing the bearing element holder 26, punching of external diameter and internal opening thereof as well as formation of the disk-like convex 32 are carried out all in one process.

Figure 4A:
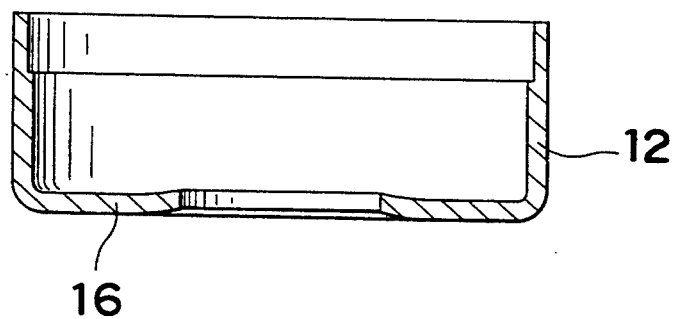
FIG. 4(A) and FIG. 4(B) are respectively a sectional view and a partially enlarged sectional view of a further component under manufacturing to be employed in the same example.
Figure 4B:
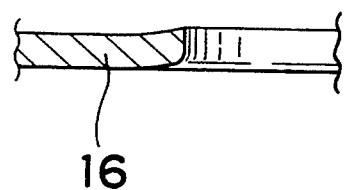

The slide bearing 8 of above construction is assembled in the following manner. First, the bearing elements 18 are fitted in the outer cylinder 10 which is still in an incomplete state, i.e., as illustrated in FIG. 4(A), in a state of cylindrindcal component having the same diameter as the cylinder 12, and of which portion to be the flange 14 has not been formed by bending yet. Then, the internal part is filled with the grease 30, the bearing element holder 26 is inserted, and thereafter the flange 14 is formed by bending, whereby the slide bearing 8 is completely formed. The portion to be the flange 14 is formed to be a little thinner than the cylindrical section 12 by press working so as to be bent easily. In addition, as illustrated in FIG. 4(B), periphery of the opening of the side wall section 16 is inclined inwardly, and corner of the the peripheral edge is protruding a little inwardly.

Figure 2A:
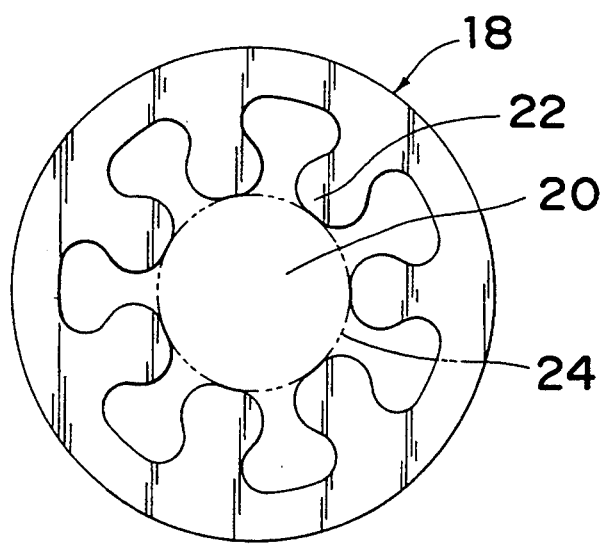
FIG. 2(A) to FIG. 2(D) are respectively a plan view, sectional view, a partially enlarged sectional view, and a partially enlarged view of a component employed in the same example.
Figure 2B:
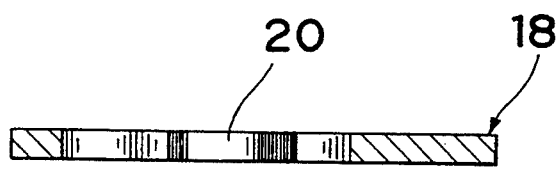
Figure 2C:
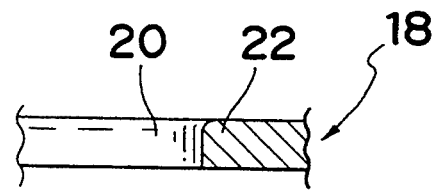
Figure 2D:
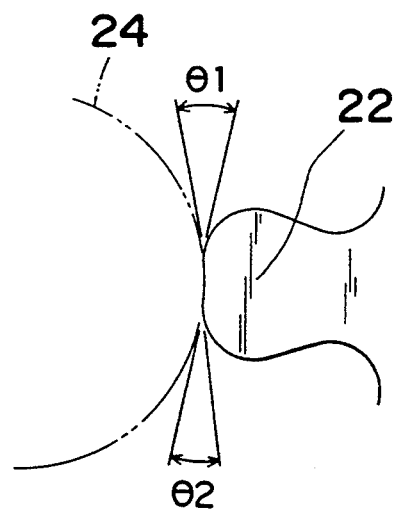

In the slide bearing 8 of above construction, the top end of the convexes 22 is in face contact with the outer periphery of the shaft 24 to be supported as illustrated in FIG. 1(A), FIG. 1(B) and FIG. 2(A), whereby the shaft 24 is rotatably supported. Since only the convexes 22 of the opening 20 of the bearing elements 18 is in contact with the peripheral surface of the shaft 24, the contact area is relatively small, resistance during sliding is reduced, and the shaft 24 can rotate lightly as much. In addition, the grease 30 charged into the convexes formed on the opening of the bearing elements is fluidized during the operation to be supplied to the mentioned contact surface for lubrication.

Since the convexes 22 on the opening 20 of the bearing elements 18 is formed so as to produce the wedge-like angles θ1, θ2 between each convex and the outer peripheral surface of the shaft 24 as illustrated in FIG. 2(D), the grease is easily fed to the contact surface between the convexes 22 and the shaft 24 as the rotation of the shaft 24 during the operation, thereby achieving a satisfactory lubrication eventually resulting in improvement in the life of the bearing.

Figure 5:
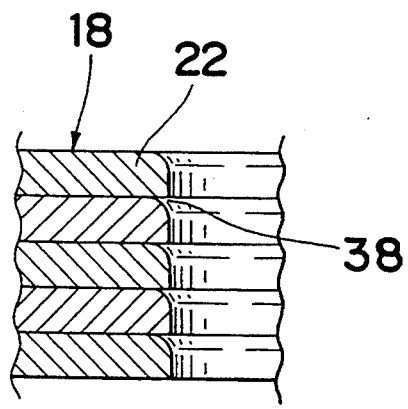
FIG. 5 is a partially sectional enlarged view illustrating a part of the same example.

As illustrated in FIG. 2(C), the the corner of the peripheral edge on the top end of the convexes 22 is slightly rounded, and therefore a gap (space) 38 capable of receiving or holding the grease is produced when superimposing the bearing elements 18 one on the other as illustrated in FIG. 5, the grease can be supplied directly to the contact surface between the convexes 22 and the shaft 24, resulting in a further desirable lubrication.

Figure 6:
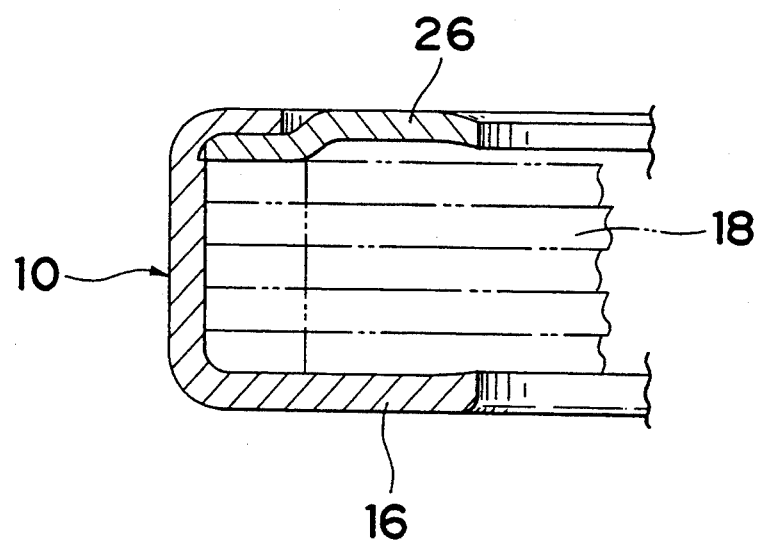
FIG. 6 is a further partially sectional enlarged view illustrating a part of the same example.

Further, as illustrated in FIG. 6, since the corners of the peripheral edges of the side wall section 16 and the bearing element holder 26 at the ends of the opening are respectively protruding inwardly, the grease fluidized during the operation is prevented from leakage.

In the slide bearing of above construction according to this example, the outer cylinder, bearing elements and bearing element holder do not require any machining, but all of them can be manufactured by press working only, resulting in shortening of manufacturing time, improvement in working efficiency, and reduction in manufacturing cost. In particular, the bearing elements having the opening of rather complicated concaves and convexes can be manufactured by punching only, the manufacturing thereof is easy, high precision is easily achieved, and reduction in manufacturing cost is also easy.

Further, since the slide bearing according to this example is easy to decide selectively any dimension of external diameter, internal diameter and width due to its advantageous construction, it becomes possible to form the slide bearing into the same size as rolling bearing, resulting in interchangeability between the slide bearing and rolling bearing.

Furthermore, in case of manufacturing slide bearings of which internal and external diameters are same and width is different, it is not necessary for a plurality of bearing elements to be particularly designed and manufactured exclusively to meet such a different width, but increase or decrease in number of the bearing elements to be used is quite sufficient and, therefore, it is very easy to meet the change in width.

Figure 7:
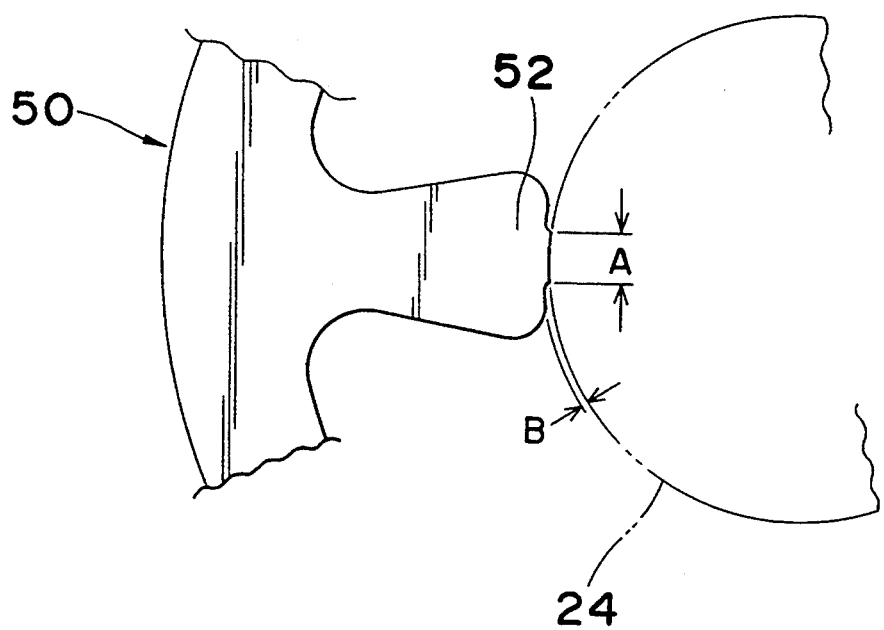
FIG. 7 is a partially enlarged plan view illustrating a modification of the components employed in the same example.

In addition, it is preferable that, as illustrated in FIG. 7, in the convex 52 formed on the opening of the bearing element 50, a width A of the portion in contact with the shaft 24 is about 0.2 to 0.5 mm, and a small step portion is formed on both sides of the contact portion so as to form a gap B of about 0.05 to 0.2 mm between the convex 52 and the shaft 24. This gap B serves not only as a space where grease is held in the form of a thin layer but also as a space where liquid lubricating oil gets in forming a layer to perform a satisfactory lubrication.

Figure 8:
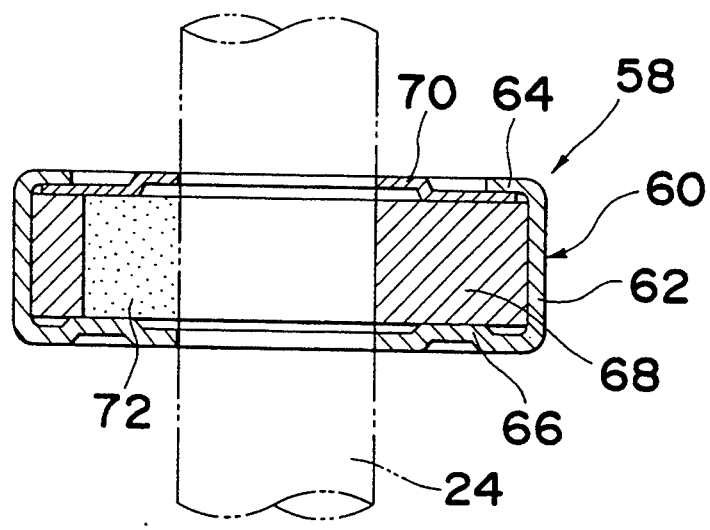
FIG. 8 is a sectional view illustrating another example of the invention.
Figure 9A:
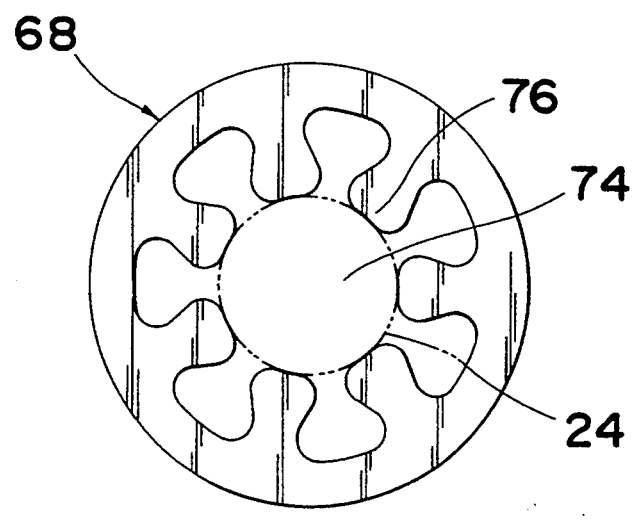
FIG. 9(A) and FIG. 9(B) are respectively a plan view and a sectional view of a component employed in the same example.
Figure 9B:
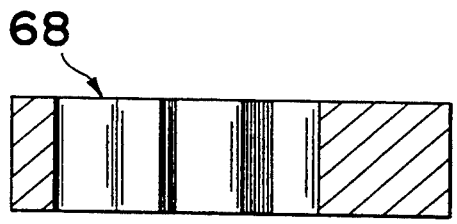

FIG. 8 illustrates another example of the invention. The slide bearing 58 of this second example comprises a single bearing element 68 of a required thickness disposed in the outer cylinder 60 formed of a thin metal plate. More specifically, the thickness of this single bearing element 68 is equal to the height of the superimposed plural bearing elements 18 of the foregoing first example. Also in the bearing element 68, as illustrated in FIG. 9(A) and FIG. 9(B), shape of the concave and convex 76 formed on the opening 74 are the same as those of the bearing elements 18 of the foregoing first example. The bearing element 68 may be composed of brass, phosphor bronze, sintered bearing alloy and other various kinds of bearing material, and may be manufactured by press working, forging machining, electric discharge machining, etc.

The outer cylinder 60 has the cylindrical section 62 in the same manner as the foregoing first example. Reference numeral 70 denotes the bearing element holder, 64 denotes the flange, 66 denotes the side wall section, and 72 denotes the grease serving as a lubricant.

In addition, charging the lubricant into the concave of the opening may be omitted on condition that the bearing element 68 is composed of a sintered bearing alloy. Whether or not the lubricant is omittable depends upon the operating condition of the bearing.

In the slide bearing of this second example, even when a shaft is supported by the single bearing element of sintered bearing alloy, bearing area is reduced, which results in reduction of resistance during sliding. It is a matter of course that the slide bearing of this second example also has an interchangeability with rolling bearing.

Figure 10A:
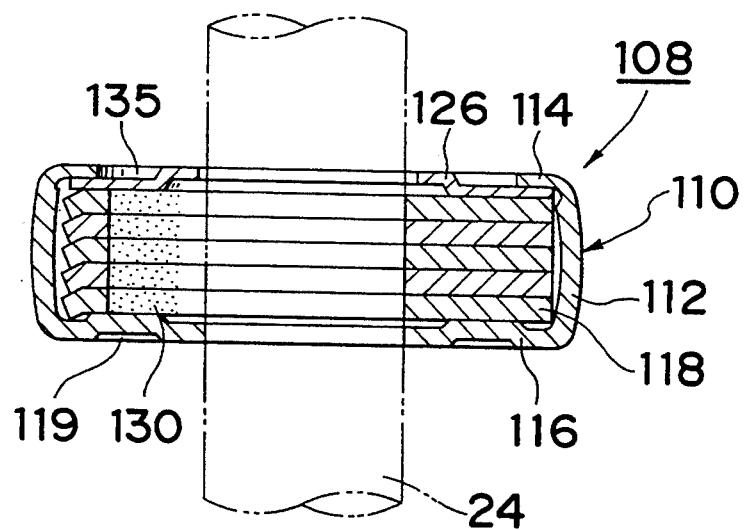
FIG. 10(A) and FIG. 10(B) are respectively a sectional view and a plan view illustrating a further example of the invention.
Figure 10B:
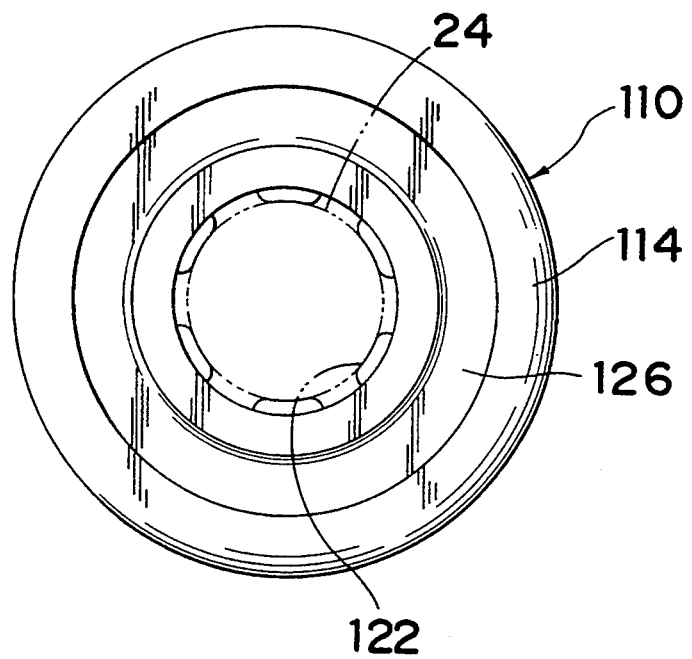

FIG. 10(A) and FIG. 10(B) illustrate a further example of the invention. The slide bearing 108 of this third example is a small size bearing of the same size as rolling bearing of small diameter, though it is enlargedly illustrated in the drawing.

Figure 11:
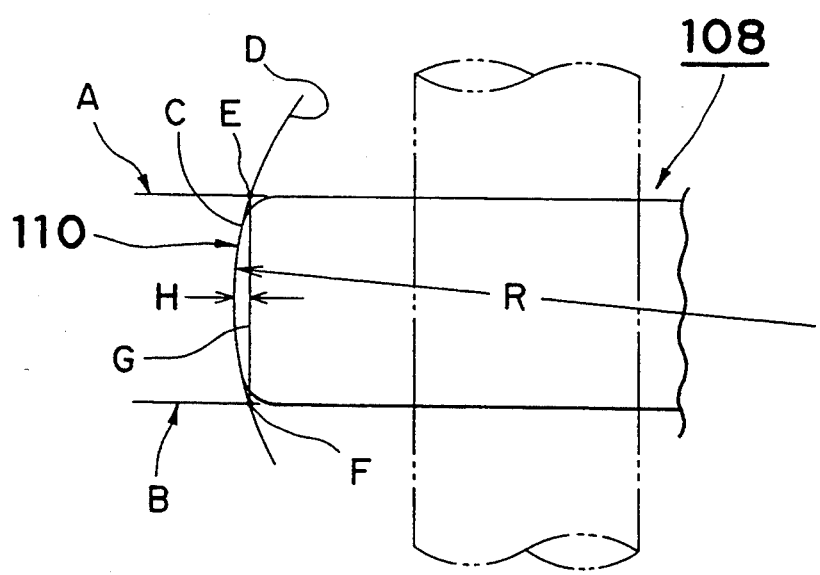
FIG. 11 is an explanatory view of a component employed in the same example.

Shapes of the cylindrical section 112 and side wall section 116 of the outer cylinder 110, and shapes of the bearing element holder 126 and the bearing elements 118 are different from those of the slide bearing 8 illustrated in FIG. 1, but the remaining parts are the same as the first example of FIG. 1. In the outer cylinder 110, outside of the cylindrical section 112 is convex spherical surface, and corner of the outside is slightly rounded. As for the curvature of the convex spherical surface, the distance H illustrated in FIG. 11 is designed to be 0.1 to 0.4 mm. More specifically, the distance H between the virtual cylindrical surface G and the convex spherical surface C is designed to be 0.1 to 0.4 mm in radial direction at the center position of width of the outer cylinder 110, said virtual cylindrical surface G being formed by a cylindrical surface of which combined imaginarily drawing two annular crossover circle lines having intersection points E, F between two virtual planes A, B tangential to two sides of the slide bearing 108 and a vertual concave spherical surface D being in face contact with said convex spherical surface C. The distance H is different depending upon the bearing size, but in case that internal diameter of the bearing is not more than 5 mm such as 2 mm, 3 mm, 4 mm, 5 mm for example, it is preferable that the distance H is about 0.1 to 0.2 mm. In case that internal diameter of the bearing is not less than 6 mm such as 6 mm, 7 mm, 8 mm for example, it is preferable that the distance H is about 0.3 mm. Describing a slide bearing of which internal diameter is 3 mm, external diameter is 8 mm and width is 4 mm for example, when the curvature radius R of the convex spherical surface C is 16 mm, then the distance H becomes about 0.12 mm. The curvature of the convex spherical surface C is exaggeratedly illustrated in FIG. 11 for the sake of explanation.

In the side wall section 116, as illustrated in FIG. 10(A), an annular recessing section 119 substantially coaxial with the outer cylinder 112 is formed in the middle of radial width of the side wall section 116. Though depth and width of the recessing section 119 is variable depending upon bearing size, it is established in this example that the depth is about 0.15 to 0.3 mm, and the width in radial direction is about 0.8 to 3.5 mm. As a result of forming such a recessing section 119, total area of the finished side wall section 116 can be reduced and there is no more need of finishing precisely any surface portion not actually required to do so, thus manufacturing cost bering reduced. The similar recessing section is also formed in the side wall section 66 illustrated in FIG. 8. The bearing elements 118 may be also arranged in the form of the bearing element 50 illustrated in FIG. 7.

Figure 12A:
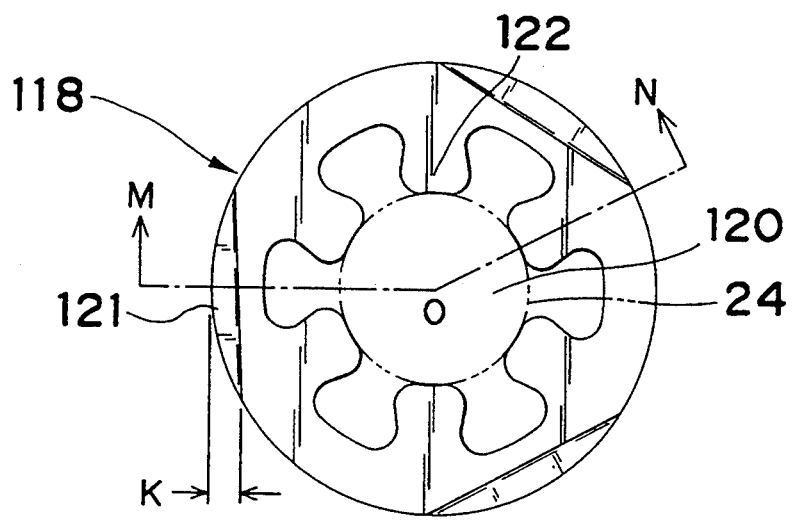
FIG. 12(A) to FIG. 12(D) are respectively a plan view, a sectional view taken along the line M-O-N in FIG. 12(A), a partially enlarged sectional view, and a partially enlarged view of another component employed in the same example.
Figure 12B:
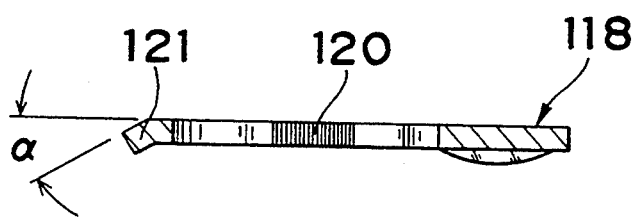

The bearing elements 118 may be composed of various metals or plastics, but when employing stainless steel plate, a bearing of superior resistance to abrasion and improved life can be obtained. That is, the bearing elements 118 are formed by press working of a stainless steel plate and are disk-shaped members of certain thickness in each of which an opening 120 having a plurality of concaves and convexes (6 concaves and convexes when internal diameter of the bearing is 3 mm, and 7 to 8 concaves and convexes when it is 8 mm) in the center. The bearing elements 118 can be fitted inside the outer cylinder 110. The bearing elements 118 are the same as the bearing elements 18 except that bent edges 121 are formed on the outer edge. More specifically, as illustrated in FIG. 12(A), FIG. 12(B) and FIG. 6. at least three bent edges 121 (three bent edges in this example) are formed on the periphery of the bearing elements 118. These bent edges 121 are formed by bending in one direction at a position where distance from outer periphery is K, arid of which bending angle $\alpha$ is set to about 15° to 40° (30° in this example). The mentioned distance K is variable depending upon size of the bearing, but it is generally about 0.3 to 1.5 mm (0.4 mm in this example). The bearing elements 118 are manufactured by punching the outline (contour) and the opening 120 having the concaves and convexes and forming the bent edges 121 from a stainless steel plate all in one process.

Figure 12C:
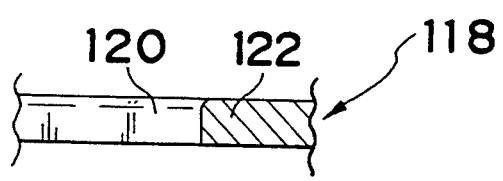

Corner portion in face contact with the shaft 24 at the top and of the convexes 122 is slightly rounded about 0.03 to 0.15 mm on one side of the bearing elements 118 as illustrated in FIG. 12(C).

A plurality of bearing elements 118 (five in this example) of above construction are superimposedly fitted in the outer cylinder 110, and spaces of concaves in the opening 120 of the bearing elements 118 are filled with the grease 130 serving as lubricant. Further, the bearing elements 118 are disposed so as to be pressed by the flange 114 through the bearing elements holder 126. The filling of mentioned concaves with the grease 130 may be performed in the same manner as the slide bearing 8 illustrated in FIG. 1(A).

In assembling the slide bearing, when each of the bearing elements 118 are superimposed one another and rotated lightly in forward and reverse directions, each of the convexes 122 may be positioned on the same phase by the function of the bent edges 121, resulting in automatic adjustment. In other words, since the bent edges 121 are superimposed one another at the same position by the mentioned light rotation, the concaves and convexes on the opening 120 are arranged on the same phase. In this regard, considerably troublesome works such as insertion of a phase adjusting gauge in the concaves have been heretofore required to adjust phase of the concaves and convexes.

Such troublesome works can be omitted as a result of providing the bent edges 121, whereby it becomes possible to achieve improvement in productivity and reduction in production cost. Furtheremore, when mounting the bent edges 121 in the outer cylinder 110, the corners of the bent edges bite inside the flange 116, whereby the bearing elements 118 are prevented from rotation in the outer cylinder 110. In addition, it is also possible to form bent edges similar to the mentioned ones on the bearing elements 18 of the foregoing first example illustrated in FIG. 1(A), thereby the same technical advantage as the above being achieved.

Figure 17A:
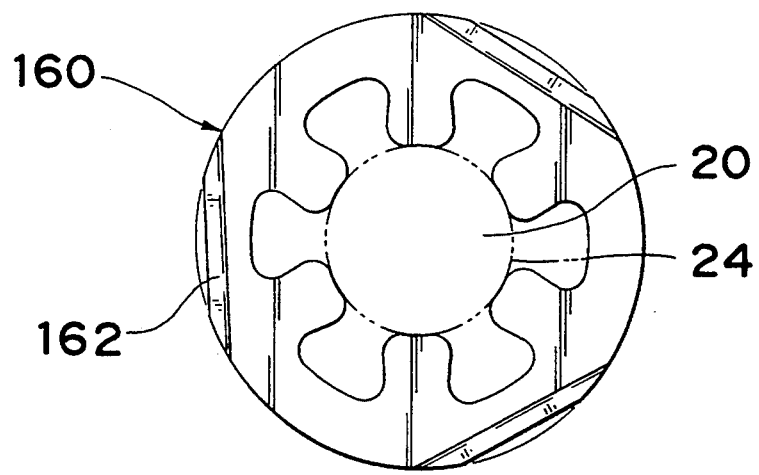
FIG. 17(A) and FIG. 17(B) are respectively a plan view and a partially sectional view of another component of the same example.

The bent edges 121 of the bearing elements 118 are formed by bending a completely circular disk-like material. It is also preferable that, like the bearing element 160 illustrated in FIG. 17(A), periphery of a disk-like material is cut into a small arch shape, which is then bent to form a bent edge 162. As the corner of this bent edge 162 is linear, the corner is to bite linearly inside the flange 116, although the corners of the bent edges 121 of the mentioned bearing elements 118 bite in the flange 116 in a manner of dot. As a result, the advantage of preventing the bearing element from rotation is largely exhibited.

Figure 13A:
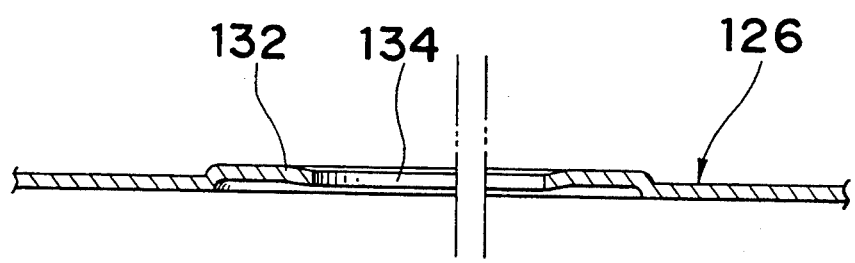
FIG. 13(A) and FIG. 13(B) are respectively a sectional view and a partially enlarged sectional view of a further component employed in the same example.
Figure 13B:
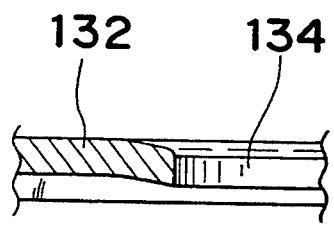

As illustrated in FIG. 13, the bearing element holder 126 is an annular plate-like member of which shape is similar to the bearing element holder 26 illustrated in FIG. 3 and employed in the foregoing example, and having the similar disk-like convexes 132 and opening 134. As illustrated in FIG. 13(B), the protruding manner of the peripheral edge of the opening 134 is also similar to the mentioned bearing element holder 26. It is also preferable that the corner of the peripheral edge of the opening 134 is formed flat instead of protruding it. This manner of formation is applicable in the same way to the opening 34 of the bearing element holder 26.

There is, however, a difference between the bearing element holders 26 and 126 in the aspect that external diameter of the disk-like convex 132 is small and that the annular recessing section 135 as illustrated in FIG. 10(A) is formed between inside of the opening of the flange 114 and outer periphery of the disk-like convex 132. As a result of forming the recessing section 135, there is no more need of finishing precisely any surface portion not actually required to do so, eventually resulting in reduction of manufacturing cost.

The bearing element holder 126 is manufactured in the same manner as the mentioned bearing element holder 26 by punching the contour and the opening and forming the disk-like convex 132 from a thin metal plate all in one process.

Figure 14A:
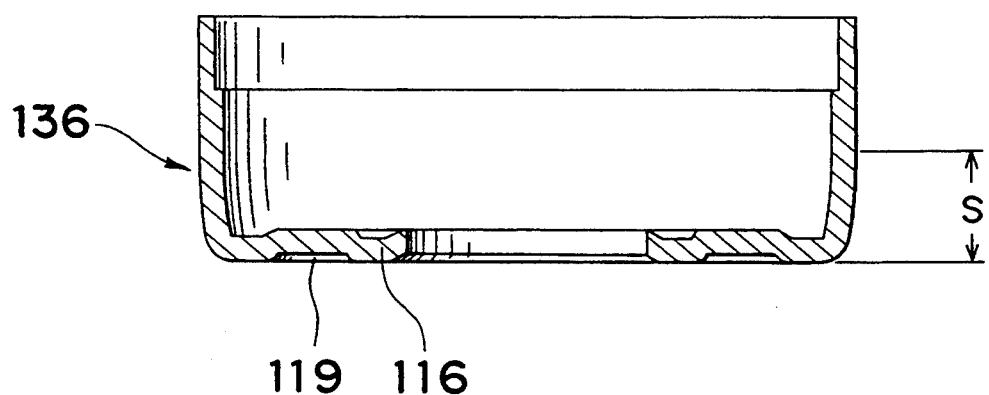
FIG. 14(A) and FIG. 14(B) are respectively a sectional view and a partially enlarged sectional view of a component under manufacturing to be employed in the same example.
Figure 14B:
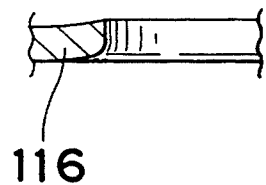

The slide bearing 108 is arranged in the mentioned manner. And the manufacturing method thereof comprised the steps of; punching a blank for the outer cylinder 110 from a thin metal plate; drawing the blank thereby forming an end of the side wall section 116, a part of the outer cylinder 112 and the recessing section 119 in one process; and punching the hole for insetion of the shaft 24 in the center of the end of the side wall section 116 thereby obtaining an incomplete outer cylinder 136 as illustrated in FIG. 14(A). More specifically, in the portion S in the drawing corresponding to half of the bearing width, half of the convex spherical surface is formed, while the remaining part being a cylinder of equal diameter, and a part to be formed into the flange 114 has not been bent yet, though the part to be the flange 114 has been made thinner than the cylindrical section 112 preliminarily at the time of the mentioned drawing step so as to be bent easily. A plurality of bearing elements are superimposedly fitted in the mentioned incomplete outer cylinder 136. After the internal part being filled with the grease 130, the bearing element holder 126 is inserted, and then the part to be formed into the remaining convex spherical surface is formed by drawing and the part to be formed into the flange 114 is bent, thus a slide bearing 108 being completed.

In the slide bearing 108 of above construction, the top end of the convex 122 of the bearing elements 118 is in face contact with the peripheral surface of the shaft 24 to be supported, whereby the shaft 24 is rotatably supported as illustrated in FIG. 10(A) and FIG. 10(B) in the same manner as the slide bearing 8 of the foregoing first example illustrated in FIG. 1(A) and FIG. 1(B).

In the slide bearing 108 of this example, since the outside is of convex spherical surface, automatic centering is achieved even when attaching the slide bearing 108 on the cylindrical opening at the time of actual use, resulting in simple and easy attaching. Since the automatic centering is performed, machining precision of the mounting hole of the bearing is not required to be so high, which also results in reduction in operating cost of the bearing. In addition, in the foregoing examples illustrated in FIG. 1 and FIG. 8, it is also preferable that the outer cylinders 10, 60 are provided with a cylindrical section having a convex spherical surface similar to the mentioned one, instead of straight cylindrical section, whereby the same technical advantage as above is achieved.

Furthermore, the slide bearing of this example of above construction can be manufactured by press working without machining, resulting in improvement in working efficiency and reduction in cost. It is also possible to make size of the internal diameter, external diameter and width of this slide bearing to be the same as those of rolling bearing, resulting in interchangeability with rolling bearing. Moreover, resistance during sliding is decreased resulting in light sliding.

Figure 12D:
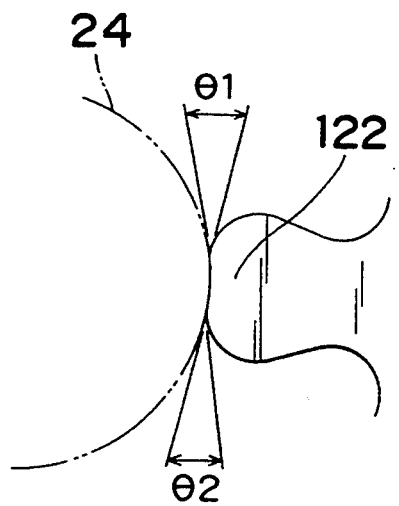

As illustrated in FIG. 12(D), in the bearing elements 118, the convexes 122 are formed so as to produce wedge-like angles $\theta_1$, $\theta_2$ between them and outer peripheral surface of the shaft 24 in the same manner as the convexes 22 illustrated in FIG. 2(d). Accordingly, the grease 130 is forcedly supplied with ease to the contact surface between the convexes 122 and the shaft 24, whereby a satisfactory lubrication is achieved resulting in improvement in life of the bearing.

Figure 15:
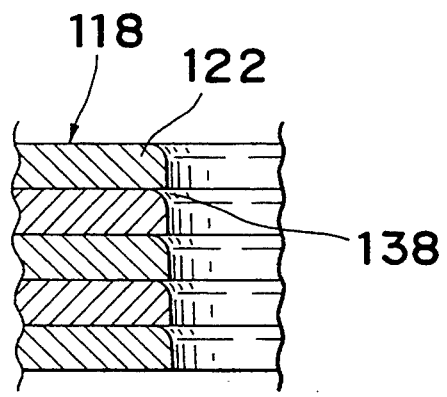
FIG. 15 is a partially sectional explanatory view illustrating a part of the same example.

Since corner of the peripheral edge on the top end of the convexes 122 is slightly rounded in the same manner as the convexes 22, a gap (space) 138 for receiving and holding the grease is produced when superimposing the bearing elements 118 as illustrated in FIG. 15, whereby the grease 130 may be directly supplied to the contact surface between the convexes 122 and the shaft 24, resulting in improvement in lubrication all the more.

Figure 16:
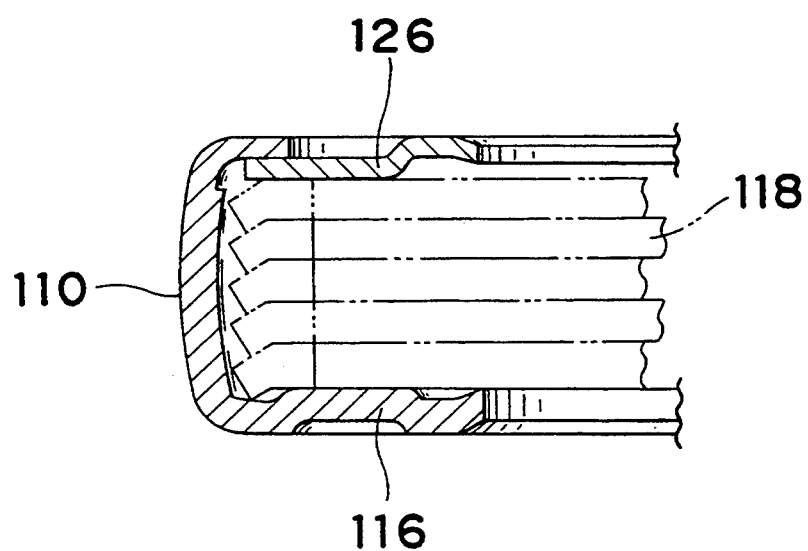
FIG. 16 is another partially sectional explanatory view illustrating a part of the same example.
Figure 17B:
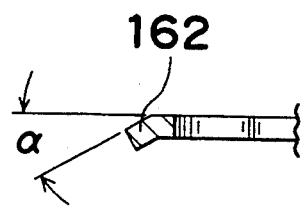

Further, as illustrated in FIG. 16 and FIG. 17, since the corners of the side wall section 116 and the bearing element holder 126 are respectively protruding inwardly, there is a further advantage such that the grease fluidized during the operation may be prevented from leakage.

In each of the foregoing examples, it is also preferable that the outer cylinders 10, 60, 110 and the bearing element holders 26, 70, 126 are composed of any metal plate other than the mentioned thin steel plate, and that the bearing elements 18, 118 are composed of any metal or plastics other than the mentioned stainless steel. It is also satisfiable that any oil-impregnated material composed of a fiber material impregnated with a lubricant is employed instead of the grease. Number of the concaves and convexes on the openings 20, 74, 120 of the bearing elements 18, 68, 118 may be increased or decreased, and shape of the convexes and concaves may be varied.

Although the bearing element holders 26, 70, 126 are employed in the foregoing examples, it is also satisfiable that the bearing elements are directly pressed and secured to inside the flange of the outer cylinder, omitting the mentioned bearing element holders, as the case may be. As a result of such omission, it is certain that the lubricant such as grease tends to leak, but there is sometimes the case that such leakage is prevented or ignorable. The omission of the bearing element holder results in reduction in manufacturing cost.

It should be understood that the forefoing relates to only several preferred embodiments of the present invention, and that it is intended to cover all changes and modifications of the examples of the invention herein chosen for the purpose of the disclosure without departing from the spirit and scope of the invention.

What is claimed is:

1. A slide bearing comprising:
   an outer cylinder in which; a flange is formed on one end of a cylindrical section made of thin metal plate by bending it inwardly and perpendicularly; an annular slide wall section is formed on the other end of the cylindrical section by bending it inwardly and perpendicularly; and a plurality of bearing elements are superimposed one on another in an internal part of the outer cylinder;
   said plurality of bearing elements being disk-shaped so as to be disposed in said outer cylinder; and in the center of which an opening having a plurality of concaves and convexes are formed; said convexes protruding inwardly being capable of supporting an object to be supported in face contact with outer periphery of shaft of the object to be supported; and a lubricant being received in said concaves;
   and a disk-shaped bearing element holder which is disposed inside said flange of the outer cylinder so that said bearing elements superimposed inside the outer cylinder may be pressed and secured to said side wall section; and in the center of said bearing element holder, an opening is provided so that the shaft of said object to be supported may be inserted therethrough.

2. A slide bearing as set forth in claim 1, in which top end of said convexes is formed so that a wedge-like angle may be produced between a circumferential tangential line of said shaft and that of the convexes at a contact point between said convexes formed on the opening of the bearing elements and said shaft of the object to be supported.

3. A slide bearing as set forth in claim 2, in which said wedge-like angle is produced by rounding two sides of the top end of said convexes formed on the opening of said bearing elements, and said concaves of the opening are formed so that inner part thereof is wider than entrance part.

4. A slide bearing as set forth in claim 1, in which said convexes formed on the opening of bearing elements has a circumferential width of about 0.2 to 0.5 mm at the contact part between said shaft of the object to be supported and said convexes; and a very small step is formed on circumferential side of said contact part so as to produce a gap of 0.05 to 0.2 mm between peripheral surface of the shaft and the convexes, and two sides of the top end of each convex are rounded, whereby a substantially wedge-like angle is produced between said peripheral surface of the shaft and each convex.

5. A slide bearing as set forth in any of claims 1 to 4, in which periphery of said opening of the side wall section formed on one end of the outer cylinder is inclined inwardly so that corner on the peripheral edge of the opening may be slightly protruded inwardly.

6. A slide bearing as set forth in claim 1, in which a disk-like convex is formed in said bearing element holder coaxially with an external diameter of the bearing element holder on the opposite side of a contact side in contact with said bearing element, said disk-like convex being either of the same size as an internal diameter of the opening of the flange of the outer cylinder or a little smaller than said internal diameter; and periphery of said opening formed in the center is inclined to the opposite direction of said protruding disk-like convex so that corner of peripheral edge of the opening may protrude a little toward the opposite direction of the protruding disk-like convex.

7. A slide bearing as set forth in claim 1, in which said bearing elements are formed by punching; in said opening, at least either one side or two sides of said corner of the peripheral edge on the top of the convexes formed on the opening is chamfered or rounded so as to form gaps for holding a lubricant between said peripheral edges on the opening of each bearing elements superimposed one another.

8. A slide bearing as set forth in claim 1, in which said outer cylinder and said bearing element holder are composed of one material selected from among steel plate, phosphor bronze plate, and other various kinds of metal plate; and said plurality of bearing elements are composed of one material or two or more materials selected from among steel plate, stainless steel plate, brass plate, other various kinds of metal plate and plastics.

9. A slide bearing as set forth in claim 1, in which said side wall section of the outer cylinder is provided with an annular recessing section, and said bearing element holder is provided with an annular recessing section recessed from side face of the slide bearing on internal diameter side of said flange of the outer cylinder.

10. A slide bearing as set forth in any of claim 1, in which said bearing elements are provided with a plurality of bent edge sections formed by bending edges thereof at a bending angle 15 to 40°.

11. A slide bearing as set forth in claim 10, in which three or more said bent edges are formed by bending from the outer periphery of the bearing elements toward one side of the bearing elements at a position 0.3 to 1.5 mm in radial direction.

12. A slide bearing as set forth in claim 1, in which said outer cylinder having a bulged cylindrical section of which outside is formed into a convex spherical surface.

13. A slide bearing as set forth in claim 12, in which curvature of said convex spherical surface of the outer cylinder is established so that a distance between a virtual cylindrical surface and said convex spherical surface is designed to be 0.1 to 0.4 mm in radial direction at a center position of width of the outer cylinder, said virtual cylindrical surface containing two circles formed by intersection between two virtual planes tangential to two sides of the slide bearing and a virtual concave spherical surface in face contact with said convex spherical surface.

14. A slide bearing comprising:
an outer cylinder in which; a flange is formed on one end of a cylindrical section made of thin metal plate by bending it inwardly and perpendicularly; an annular side wall section is formed on the other end of the cylindrical section by bending it inwardly and perpendicularly; and a single bearing element disposed in an internal part of the outer cylinder;
and said bearing element being disk-shaped so as to be disposed in said outer cylinder; and in the center of which an opening having a plurality of concaves and convexes are formed; said convexes protruding inwardly being capable of supporting an object to be supported in face contact with outer periphery of shaft of the object to be supported; and a lubricant being received in said concaves;
and a disk-shaped bearing element holder which is disposed inside said flange of the outer cylinder so that said bearing element disposed inside the outer cylinder may be pressed and secured to said side wall section; and in the center of said bearing element holder, an opening is provided so that the shaft of said object to be superimposed may be inserted therethrough.

15. A slide bearing as set forth in claim 14, in which said single bearing element is composed of only one material selected from among brass, phosphor bronze, sintered bearing alloy, and other various kinds of bearing material, and in which said concaves of the opening may be either filled or not filled with a lubricant when said single bearing element is composed of a sintered bearing alloy.

16. A slide bearing comprising:
an outer cylinder in which; a flange is formed on one end of a cylindrical section made of thin metal plate by bending it inwardly and perpendicularly; an annular side wall section is formed on the other end of the cylindrical section by bending it inwardly and perpendicularly; and a plurality of bearing elements are superimposed one on another in an internal part of the outer cylinder;
and said plurality of bearing elements being disk-shaped so as to be disposed in said outer cylinder; and in the center of which an opening having a plurality of concaves and convexes are formed; said convexes protruding inwardly being capable of supporting an object to be supported in face contact with outer periphery of shaft of the object to be supported; and a lubricant being received in said concaves;
and said bearing elements are directly pressed and secured inside of said flange.

* * * * *